(12) United States Patent
You et al.

(10) Patent No.: US 12,502,417 B2
(45) Date of Patent: Dec. 23, 2025

(54) ANTI-HIV-1 COMPOSITION CONTAINING SCOTIN PROTEIN

(71) Applicants: THE CATHOLIC UNIVERSITY OF KOREA INDUSTRY-ACADEMIC COOPERATION FOUNDATION, Seoul (KR); POSTECH RESEARCH AND BUSINESS DEVELOPMENT FOUNDATION, Pohang-si (KR)

(72) Inventors: Ji Chang You, Seoul (KR); Kyung Lee Yu, Bucheon-si (KR); Joo-Yeon Yoo, Pohang-si (KR); Nari Kim, Seogwipo-si (KR)

(73) Assignees: THE CATHOLIC UNIVERSITY OF KOREA INDUSTRY—ACADEMIC COOPERATION FOUNDATION, Seoul (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 428 days.

(21) Appl. No.: 18/008,773

(22) PCT Filed: Sep. 14, 2021

(86) PCT No.: PCT/KR2021/012533
§ 371 (c)(1),
(2) Date: Dec. 7, 2022

(87) PCT Pub. No.: WO2022/060062
PCT Pub. Date: Mar. 24, 2022

(65) Prior Publication Data
US 2023/0293627 A1    Sep. 21, 2023

(30) Foreign Application Priority Data
Sep. 17, 2020 (KR) ........................ 10-2020-0120048

(51) Int. Cl.
*A61K 38/16* (2006.01)
*A61P 31/18* (2006.01)

(52) U.S. Cl.
CPC .............. *A61K 38/16* (2013.01); *A61P 31/18* (2018.01)

(58) Field of Classification Search
CPC ............................... A61K 38/16; A61P 31/18
See application file for complete search history.

(56) References Cited

U.S. PATENT DOCUMENTS

2004/0146971 A1    7/2004    Lane et al.

FOREIGN PATENT DOCUMENTS

| KR | 10-2017-0056902 | 5/2017 |
| KR | 10-2018-0031277 | 3/2018 |

OTHER PUBLICATIONS

Kim, Nari, et al. "Interferon-inducible protein SCOTIN interferes with HCV replication through the autolysosomal degradation of NS5A." Nature communications 7.1 (Feb. 12, 2016): 1-12.
Bourdon, J-C., et al. "Scotin, a novel p53-inducible proapoptotic protein located in the ER and the nuclear membrane." The Journal of cell biology 158.2 (Jul. 22, 2002): 235-246.

*Primary Examiner* — Sikarl A Witherspoon
(74) *Attorney, Agent, or Firm* — LEX IP MEISTER, PLLC

(57) ABSTRACT

The present invention relates to an anti-HIV-1 composition including SCOTIN protein and a nucleotide encoding the same; use of preventing and treating HIV-1 infection, including the composition; or a method for inhibiting the generation and proliferation of the virus, and the SCOTIN protein has effects on the expression and action of important structural proteins of HIV-1, thereby effectively inhibiting the generation and proliferation of HIV-1.

9 Claims, 5 Drawing Sheets

Specification includes a Sequence Listing.

ANTI-HIV-1 COMPOSITION CONTAINING SCOTIN PROTEIN

CROSS-REFERENCE TO RELATED APPLICATION

This application claims priority to and the benefit of Korean Patent Application No. 10-2020-0120048, filed on Sep. 17, 2020, the disclosure of which is incorporated herein by reference in its entirety.

SUBMISSION OF SEQUENCE LISTING

The contents of the electronic sequence listing (EPL20225963US_sequence_listing_revised.txt; Size: 3,534 bytes; and Date of Creation: Apr. 28, 2023) is herein incorporated by reference in its entirety. The contents of the electronic sequence listing in no way introduces new matter into the specification.

TECHNICAL FIELD

The present invention relates to an anti-HIV-1 composition including a SCOTIN protein or a polynucleotide encoding the same or a method for inhibiting the survival and proliferation of the virus.

BACKGROUND ART

Human immunodeficiency virus type-1 (HIV-1) is an infectious agent of acquired immunodeficiency syndrome (AIDS) and belongs to retroviruses that destroy the human immune system. HIV-1 infects living immune cells such as helper T cells (CD4+ region of T cells), macrophages, dendritic cells and the like, leading to viral necrosis of infected cells and increased apoptosis of T cells, and as CD8 cytotoxic lymphocytes recognize and destroy infected CD4+ T cells, cell-mediated immunity is lost when the number of CD4+ T cells falls below lethal levels, and as a result, they can be easily exposed to other opportunistic infections.

When a patient is infected with HIV-1, the periodic administration of anti-lentiviral agents can lower the mortality rate from infection. The representative anti-lentiviral agent is zidovudine (AZT), and various single agents or combination agents are used for the clinical treatment of HIV-1. There are six classes of anti-lentiviral agents used worldwide, that is, nucleic acid reverse transcriptase inhibitors (NRTIs), non-nucleoside reverse transcriptase inhibitors (NNRTIs), protease inhibitors (PI), fusion inhibitors (Fusion I), CCR5 antagonists and integrase inhibitors. Currently, the combination therapy of two types of NRTIs and one type of PI or NNRTI is widely used as a standard therapy for highly active anti-retroviral therapy (HARRT) in the initial treatment of patients with no previous treatment experience.

The SCOTIN protein is a protein which is present in the intracellular endoplasmic reticulum or nuclear membrane, and is known to induce apoptosis dependent on p53 or Caspase. Although various studies have been conducted on the SCOTIN protein, the effects related to the treatment or prevention of HIV-1 infection is not known yet.

DISCLOSURE

Technical Problem

As such, the inventors of the present invention studied the effects of the SCOTIN protein on the generation and proliferation of HIV-1, and completed the present invention by confirming that when the SCOTIN protein is overexpressed, the expression level of the Gag protein forming the capsid protein is significantly reduced, and as a result, the generation of the virus is reduced.

Accordingly, an object of the present invention is to provide an antiviral composition against HIV-1, including a SCOTIN protein or a nucleotide encoding the same.

Another object of the present invention is to provide an antiviral use of the SCOTIN protein or a nucleotide encoding the same against HIV-1.

Still another object of the present invention is to provide a pharmaceutical composition for preventing or treating HIV-1 infectious disease, including a SCOTIN protein or a nucleotide encoding the same.

Still another object of the present invention is to provide a method for preventing or treating HIV-1 infectious disease, including administering a SCOTIN protein or a nucleotide encoding the same to a subject in need thereof.

Still another object of the present invention is to provide the use of a SCOTIN protein or a nucleotide encoding the same in the prevention or treatment of HIV-1 infectious disease.

Still another object of the present invention is to provide the use of a SCOTIN protein or a nucleotide encoding the same in the manufacture of a drug for the prevention or treatment of HIV-1 infectious disease.

Still another object of the present invention is to provide a method for inhibiting the proliferation of HIV-1 by contacting HIV-1 with an antiviral composition against HIV-1, including a SCOTIN protein or a nucleotide encoding the same.

Technical Solution

In order to achieve the above object, the present invention provides an antiviral composition against HIV-1, including a SCOTIN protein or a nucleotide encoding the same.

In order to achieve another object of the present invention, the present invention provides an antiviral use of a SCOTIN protein or a nucleotide encoding the same against HIV-1.

In order to achieve still another object of the present invention, the present invention provides a pharmaceutical composition for preventing or treating HIV-1 infectious disease, including a SCOTIN protein or a nucleotide encoding the same In order to achieve still another object of the present invention, the present invention provides a method for preventing or treating HIV-1 infectious disease, including administering a SCOTIN protein or a nucleotide encoding the same to a subject in need thereof.

In order to achieve still another object of the present invention, the present invention provides the use of a SCOTIN protein or a nucleotide encoding the same in the prevention or treatment of HIV-1 infectious disease.

In order to achieve still another object of the present invention, the present invention provides the use of a SCOTIN protein or a nucleotide encoding the same in the manufacture of a drug for the prevention or treatment of HIV-1 infectious disease.

In order to achieve still another object of the present invention, the present invention provides a method for inhibiting the proliferation of HIV-1 by contacting HIV-1 with an antiviral composition for HIV-1, including a SCOTIN protein or a nucleotide encoding the same.

Hereinafter, the present invention will be described in detail.

The present invention relates to an antiviral composition against HIV-1, including a SCOTIN protein or a nucleotide encoding the same.

In addition, the present invention relates to the antiviral use of the SCOTIN protein or a nucleotide encoding the same against HIV-1.

The SCOTIN protein is also named shisa family member 5 (SHISA5), and the expression thereof is induced by the P53 transcription factor activated by a DNA damage signal, and it is located in the endoplasmic reticulum membrane and is known to be involved in the P53-mediated apoptosis process. The SCOTIN protein is constituted by including an ER-signal peptide (SS), a cysteine-rich domain (CRD), a transmembrane domain (TM) and a proline-rich domain (PRD), and it may be derived from mammals such as primates and rodents.

As confirmed by the inventors of the present invention, it was confirmed that the SCOTIN protein affects the expression and action of Gag, which is one of the structural proteins of the HIV-1 virus in particular, and from this, since it can act on all of the generation, proliferation and extracellular release of HIV-1, it can consequently have an effect as an antiviral agent against the HIV-1 virus.

In the present invention, the SCOTIN protein may include the amino acid sequence of SEQ ID NO: 1, but is not limited thereto. The composition of the present invention may include a SCOTIN protein including the amino acid sequence of SEQ ID NO: 1 as a whole, or may include a fragment or a specific domain thereof, for example, a polypeptide including the amino acid sequence represented by SEQ ID NO: 1, but the present invention is not limited thereto.

The composition of the present invention may include a nucleic acid molecule encoding the SCOTIN protein. The nucleic acid molecule is a polynucleotide encoding the SCOTIN protein, and it may include the nucleotide sequence represented by SEQ ID NO:2.

In addition, the nucleic acid molecule is an expression vector, and it may be a viral or non-viral vector. In addition, the non-viral vector may be used without limitation by selecting from plasmids, and the viral vector may be used without limitation by selecting from adenoviral vectors, adeno-associated viral vectors, retroviral vectors, lentiviral vectors or helper-dependent adenoviral vectors, but the present invention is not limited thereto. The expression vector of the present invention is a recombinant vector, and SCOTIN-V5 is used in an exemplary embodiment of the present invention, which can be constructed through various methods known in the art.

In addition, the present invention relates to a pharmaceutical composition for preventing or treating HIV-1 infectious disease, including a SCOTIN protein or a nucleotide encoding the same.

In addition, the present invention relates to a method for preventing or treating HIV-1 infectious disease, including administering a SCOTIN protein or a nucleotide encoding the same to a subject in need thereof.

In addition, the present invention relates to the use of a SCOTIN protein or a nucleotide encoding the same in the prevention or treatment of HIV-1 infectious disease.

In addition, the present invention relates to the use of a SCOTIN protein or a nucleotide encoding the same in the manufacture of a drug for the prevention or treatment of HIV-1 infectious disease.

As used herein, the term "HIV infectious disease" is a concept that includes all symptoms and diseases caused by infection with the HIV virus, and particularly, among those infected with HIV-1 virus, when a specific opportunistic infection appears due to reduced immunity due to the destruction of immune cells, this is called acquired immune deficiency syndrome, which is also known as AIDS. The criteria for determining an AIDS patient mean cases where the number of immune cells (CD4+ T cells) of the infected person is less than $200/mm^3$ or an opportunistic infection that falls under an 'AIDS-defining disease' such as *Pneumocystis* pneumonia and the like has appeared (KCDC, AIDS Control Division).

Therefore, in the present invention, HIV-1 infectious disease means a state in which immune function is weakened by being infected with HIV-1 virus, including AIDS. The pharmaceutical composition of the present invention has an effect of alleviating, preventing or treating symptoms such as a decrease in immunity caused by the virus in a patient infected with HIV-1.

As used herein, the term "prevention" refers to any action capable of inhibiting or delaying the onset of HIV-1 infectious disease by administration of the pharmaceutical composition according to the present invention.

As used herein, the term "treatment" refers to any action in which symptoms are alleviated or ameliorated by administration of the pharmaceutical composition according to the present invention.

The pharmaceutical composition of the present invention may be formulated in the form of oral dosage forms such as powders, granules, tablets, capsules, suspensions, emulsions, syrups, aerosols and the like, external preparations, suppositories and sterile injection solutions according to conventional methods, and it may further include a carrier or excipient necessary for the formulation. Pharmaceutically acceptable carriers, excipients and diluents that may be additionally included in the active ingredient include lactose, dextrose, sucrose, sorbitol, mannitol, xylitol, erythritol, maltitol, starch, acacia gum, alginate, gelatin, calcium phosphate, calcium silicate, cellulose, methyl cellulose, microcrystalline cellulose, polyvinyl pyrrolidone, water, methylhydroxybenzoate, propylhydroxybenzoate, magnesium stearate and mineral oil. In the case of formulation, it is prepared by using commonly used diluents or excipients such as fillers, extenders, binders, wetting agents, disintegrants and surfactants.

For example, solid preparations for oral administration include tablets, pills, powders, granules, capsules and the like, and these solid preparations are prepared by mixing the extract or compound with at least one or more excipients such as starch, calcium carbonate, sucrose or lactose, gelatin and the like. In addition to simple excipients, lubricants such as magnesium stearate talc are also used. Liquid formulations for oral administration include suspensions, internal solutions, emulsions, syrups and the like, and in addition to water and liquid paraffin, which are commonly used simple diluents, various excipients such as wetting agents, sweeteners, fragrances and preservatives may be included.

Formulations for parenteral administration include sterile aqueous solutions, non-aqueous solutions, suspensions, emulsions, freeze-dried preparations and suppositories. Non-aqueous solvents and suspending agents include propylene glycol, polyethylene glycol, vegetable oils such as olive oil, injectable esters such as ethyl oleate and the like. As bases of the suppository, witepsol, macrogol, tween 61, cacao butter, laurin, glycerogelatin and the like may be used.

The pharmaceutical composition of the present invention may be administered orally or parenterally (intravenously, subcutaneously, intraperitoneally or topically) according to a desired method, and the dosage may vary depending on the patient's condition and weight, the degree of disease and the drug form, and the route and time of administration, and it may be selected in an appropriate form by those skilled in the art.

The pharmaceutical composition of the present invention is administered in a pharmaceutically effective amount. As used herein, the term "pharmaceutically effective amount" is a reasonable amount that is applicable to medical treatment and means an amount sufficient to treat a disease, and the criteria may be determined according to the patient's disease, severity, drug activity, sensitivity to drug, administration time, administration route and excretion rate, the duration of treatment, concomitant ingredients and other factors. The pharmaceutical composition of the present invention may be administered as an individual therapeutic agent or in combination with other therapeutic agents, and may be administered sequentially or simultaneously with conventional therapeutic agents. Taking all of the above factors into consideration, the dosage may be determined at a level capable of minimizing side effects, which can be easily determined by those skilled in the art. Specifically, the dosage of the pharmaceutical composition may vary depending on the patient's age, weight, severity, gender and the like, and in general, an amount of 0.001 to 150 mg, more preferably, an amount of 0.01 to 100 mg per 1 kg of body weight may be administered daily or every other day, 1 to 3 times a day. However, this is exemplary, and the dosage may be set differently as necessary.

Moreover, the present invention relates to a method for inhibiting the proliferation of HIV-1 by contacting HIV-1 with an antiviral composition against HIV-1 including a SCOTIN protein or a nucleotide encoding the same.

As previously reviewed, the SCOTIN protein has the effect of inhibiting the expression of Gag, which is an important structural protein of HIV-1. Gag protein is an important factor involved in assembling the capsid protein of HIV-1, and it is involved in the process where virus particles produced in the cell are released out of the cell (budding out). Therefore, the SCOTIN protein interferes with the action of Gag, and consequently can inhibit HIV-1 proliferation.

The method of contacting with HIV-1 may be in vitro or in vivo, but is not limited thereto, and it may be performed by methods known in the art as necessary.

Advantageous Effects

The present invention relates to the anti-HIV-1 effects of the SCOTIN protein, and more specifically, the SCOTIN protein suppresses the expression and action of the Gag protein expressed during the generation and proliferation of HIV-1, and as a result, it has the effect of inhibiting the generation of HIV-1, and it can be used for the prevention and treatment of infectious diseases caused by HIV-1.

DESCRIPTION OF DRAWINGS

FIG. 6 shows the localization of the Tsg101 protein belonging to the ESCRT complex involved in the extracellular release of HIV-1, and FIG. 7 is the results of confirming the localization of the ALIX protein belonging to the ESCRT complex-related factor.

MODES OF THE INVENTION

Hereinafter, examples will be provided to describe the present specification in detail. However, the examples according to the present specification may be modified in various other forms, and the scope of the present specification is not to be construed as being limited to the examples described below. The examples of the present specification are provided to more completely describe the present specification to those of ordinary skill in the art.

Figure 1:
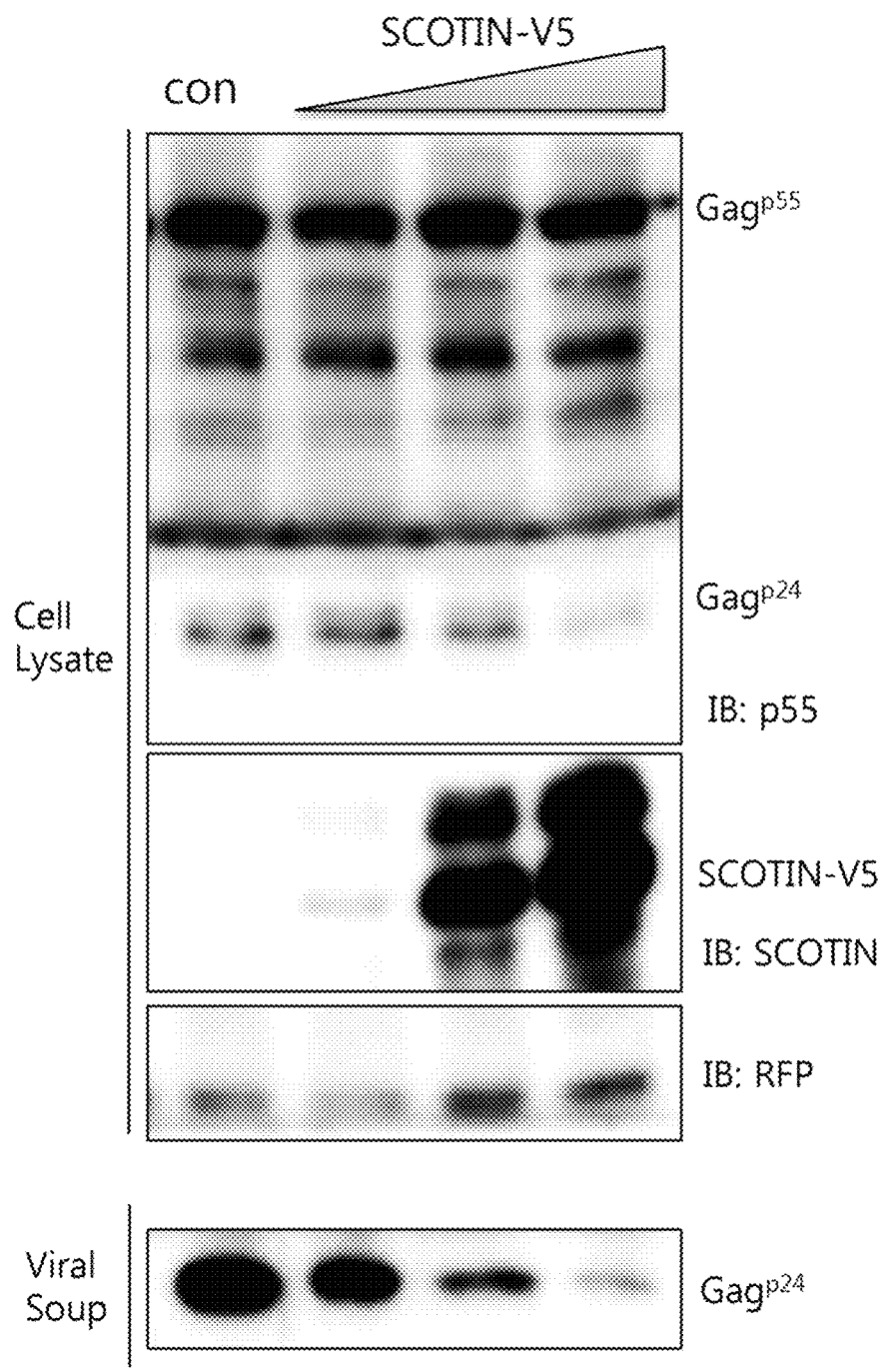
FIG. 1 is the results of confirming the amount of Gag protein expressed according to the concentration of a SCOTIN protein in the cell lysate and the virus supernatant.

Experimental Example 1. Reduction of HIV-1 Generation and Proliferation by SCOTIN Overexpression 293T cells ($2.5 \times 10^5$) were seeded in a 12-well plate and transfected by using a SCOTIN-V5 plasmid at concentrations of 100, 200 and 300 ng, respectively, 100 ng of pNL4-3GFP which is an HIV-1 pro-viral vector and 30 ng of pDs-Red which is a control vector by using Lipofector-pmax (aptabio). The SCOTIN-V5 plasmid includes a polynucleotide sequence (SEQ ID NO: 2) encoding the SCOTIN protein of SEQ ID NO: 1. At 24 hours following transfection, cell and viral supernatants were obtained. The cells were washed with 1×PBS and lysed in RIPA buffer supplemented with a protease inhibitor cocktail (P8340, Sigma-Aldrich) and 2 mM PMSF (phenylmethylsulfonylfluoride), followed by performing Western blotting to confirm the expression level of Gag protein which is a major expression protein of HIV-1. As a result, as shown in the upper graph of FIG. 1, it was confirmed that the expression level of Gag protein in the cell lysate was reduced in a concentration-dependent manner of SCOTIN-V5.

Further, in order to detect virus particles produced by HIV-1 and released out of the cells, the virus supernatant was filtered with a 0.45 μm filter, Western blotting was performed, and it was analyzed by p24 ELISA (XB-1000, Xpressbio). As a result, as shown in the extracellular (media) Western blot result at the bottom of FIG. 1, it was confirmed that the amount of Gag protein was reduced as in the cells. From this, Gag expression was reduced both inside and outside the cells, which is a result confirming that the generation of HIV-1 was inhibited in a concentration-dependent manner of SCOTIN-V5.

Figure 2:
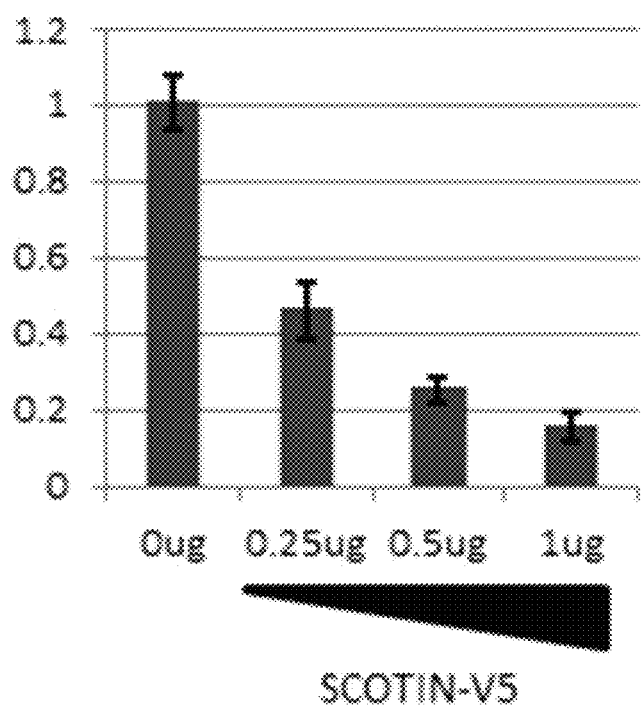
FIG. 2 shows the results of confirming the relative amounts of the capsid protein (p24) derived from the Gag protein according to the concentration of SCOTIN by ELISA analysis.

In addition, an ELISA analysis was performed on the capsid (p24) protein, which is a derivative of the Gag protein present in the supernatant, to quantitatively measure the virus particles generated outside the cell. As a result, as shown in FIG. 2, the amount of p24 protein was reduced in a concentration-dependent manner of SCOTIN-V5, and in the case of 300 ng of SCOTIN-V5, it was confirmed that the expression level was reduced by about 80%. This is another result confirming that the generation of HIV-1 is reduced.

Figure 3:
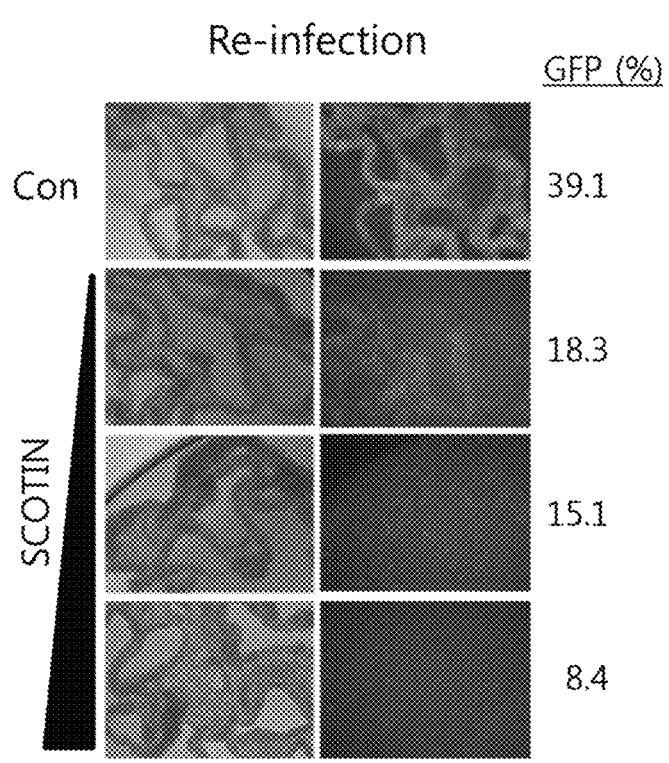
FIG. 3 is the results of confirming the infectivity of the HIV-1 virus according to the treatment concentration of SCOTIN.

In order to confirm the viral infectivity, 50 μL of the virus supernatant was treated with MT-4 cells (1×10⁵) capable of HIV-1 virus infection in a 48-well plate and cultured for 72 hours, and GFP was measured by fluorescence microscopy to confirm HIV-1 infection, and it was counted by FACS analysis (FACS Canto II, BD bioscience. As a result, as shown in FIG. 3, it was confirmed that as the concentration of SCOTIN-V5 increased, the HIV-1 infectivity to the MT-4 cell line decreased.

Experimental Example 2. Abnormal Processing of Gag Protein by SCOTIN 293T cells (2.5×10⁵) were seeded in a 12-well plate and transfected by using 200 ng of a SCOTIN-V5 plasmid and 50 ng of pNL4-3GFP which is an HIV-1 pro-viral vector, respectively, by using Lipofector-pmax (aptabio). After 24 hours, cell and virus supernatants were obtained. The cells were washed with 1×PBS, resuspended in 300 μL of buffer A (10 mM HEPES, pH 7.5, 1.5 mM MgCl2, 10 mM KCl, 0.5 mM DTT and 0.05% NP40, supplemented with protease inhibitors) and cultured on ice for 10 minutes. The cultured cells were centrifuged at 4° C. and 1,000×g for 10 minutes. The supernatant containing the cytoplasmic extract was transferred to a new 1.5 mL tube and centrifuged again (13,000 rpm for 3 minutes at 4° C.) to remove the remaining nuclei, and Western blotting was performed on the cytoplasm.

Figure 4:
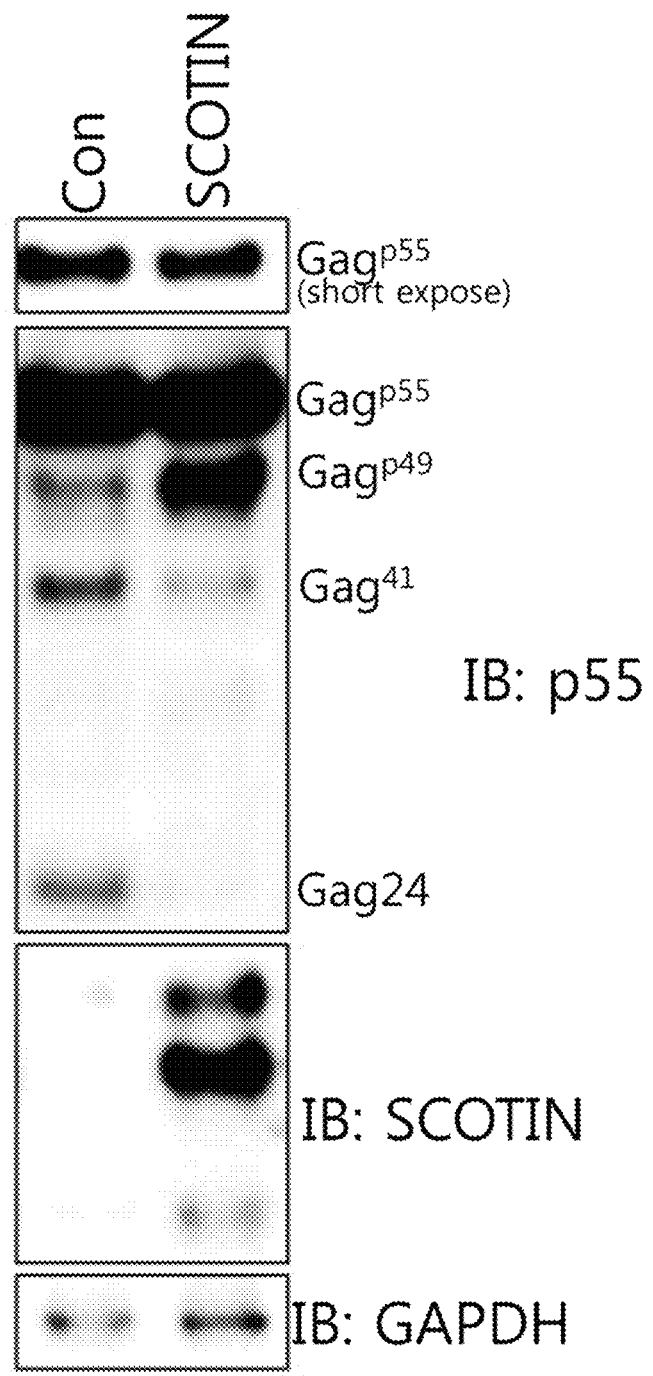
FIG. 4 confirms the abnormal processing results of Gag protein according to the treatment of SCOTIN.

As a result, as shown in FIG. 4, it can be seen that the amount of p49 was increased and the amount of p24 was decreased among the Gag protein derivatives in the cells expressing SCOTIN, compared to the control group. This is confirmed as a result of SCOTIN being involved in the processing of Gag protein by HIV-1 protease, causing non-ideal processing.

Experimental Example 3. Gag Multimerization Inhibitory Effect of SCOTIN

HeLa cells were seeded on cover slips (Marienfeld, Germany) at 4× 10⁴ cells/well in a 24-well plate. The next day, the cells were transfected with pNL4-3GFP and mCherry expression vector, which is a control vector, or SCOTIN-mCherry vector, by using Lipofector-pmax according to the manufacturer's protocol (aptabio). After 24 hours, the cells were washed with 1×PBS and fixed in 4% paraformaldehyde. The fixed cells were permeabilized for 20 minutes, blocked in 0.1% TritonX-100, 2% BSA and 5% normal horse serum for 30 minutes, and then cultured with the indicated primary antibody for 2 hours. The cells were washed 3 times for 10 minutes each with 1×PBS/0.1% Tween-20 (1×PBST), cultured with fluorescence-conjugated secondary antibody for 1 hour in the dark room and then washed twice in 1×PBST for 10 minutes each. The cells were counterstained with DAPI (1 mg/mL in 1×PBST) for 10 minutes to detect nuclei. The cover slips were mounted on a glass surface with 10 μL drops of Vectashield h-1000 solution (Vector Laboratories Inc., CA) and sealed with nail polish. All steps were performed at room temperature.

Figure 5:
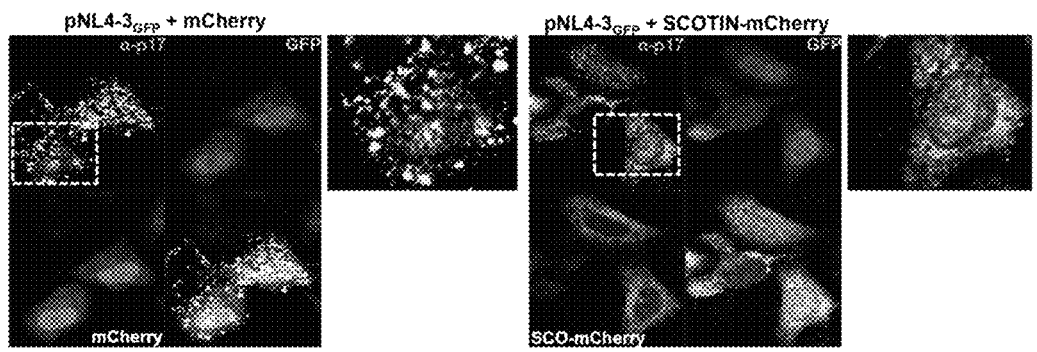
FIG. 5 is the results confirming the effects of SCOTIN protein on high order multimerization of Gag protein.

As a result, as shown in FIG. 5, it can be seen that the Gag protein was stained in the form of puncta in mCherry-expressing cells (left), but no puncta form was observed in SCOTIN-mCherry-expressing cells (right). From these results, the observation of puncta indicates that the Gag protein is in high-order multimerization, but when SCOTIN is expressed, it can be confirmed that the multimerization of the Gag protein is inhibited.

Experimental Example 4. Changes in Subcellular Localization of ESCRT Components by SCOTIN The process in which the genome and protein of HIV-1 are assembled in a cell membrane and released out of the cell is known, and in this case, the ESCRT complex is involved in the process of separating the cell membrane and the virus. In particular, among the components constituting or related to the complex, Tsg101 and ALIX, which bind to the Gag protein, are known to play an important role in the virus release process.

Figure 6:
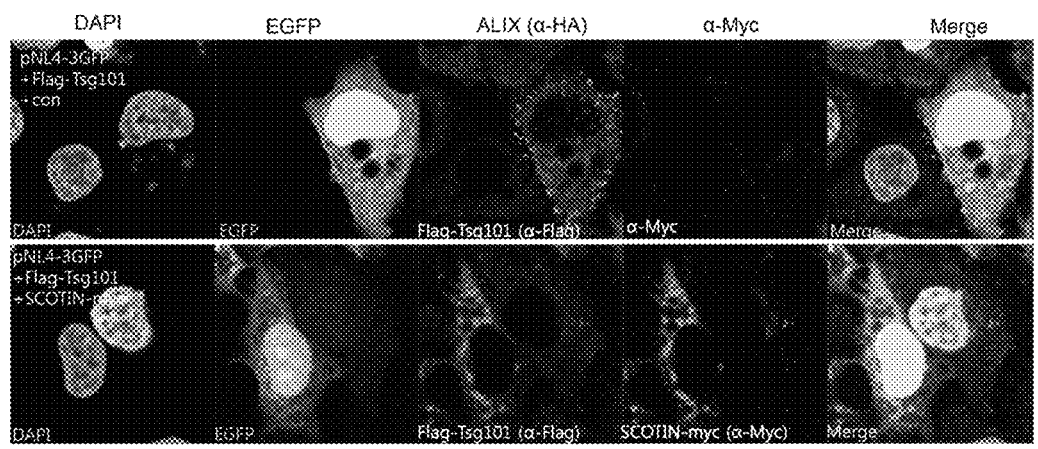
FIGS. 6 and 7 confirm the effects of the SCOTIN protein on the subcellular localization of HIV-1.

Therefore, an experiment was performed to confirm this by immunostaining, assuming that SCOTIN directly or indirectly binds to Tsg101 and ALIX, and Tsg101 and ALIX cannot play a role in HIV-1 release. First, HeLa cell lines were transfected with pNL4-3GFP and Flag-Tsg101 vectors together with a control vector or a SCOTIN-myc vector, and then immunostained after 24 hours by fixing the cells with 4% paraformaldehyde. As a result, as shown in FIG. 6, in control cells (top), pNL4-3GFP-expressing cells (GFP-expressing cells) had Tsg101 stained on the cell membrane in the form of puncta, but in SCOTIN-myc-expressing cells, it was confirmed that Tsg101 co-localized with SCOTIN-myc in the cells, thereby reducing the migration to the cell membrane.

Figure 7:
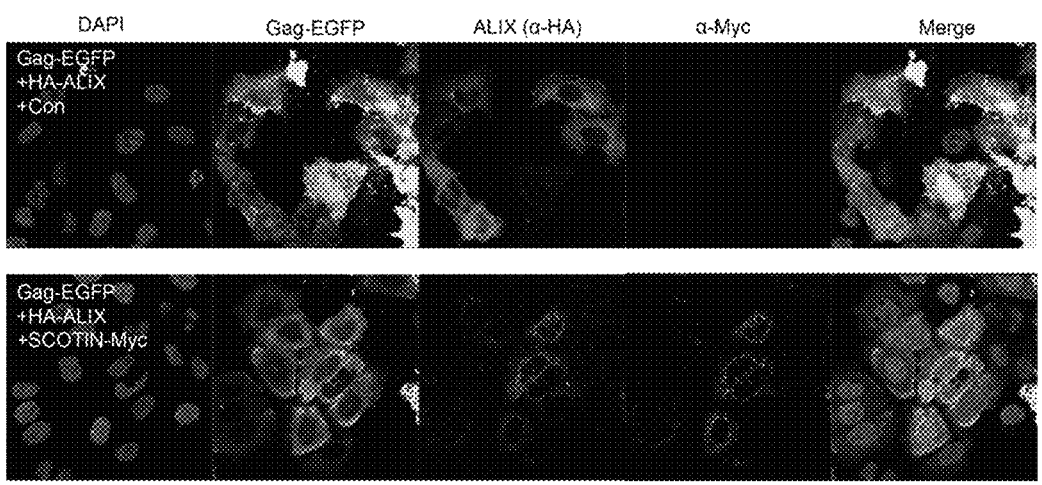

Similarly, the effect of ALIX on cell membrane migration was confirmed in the same way. As a result, as shown in FIG. 7, it was confirmed that the distribution of intracellular ALIX was spread throughout the cytoplasm in the control cells (top), but when SCOTIN-myc was expressed, it can be seen that because of this, ALIX and SCOTIN-myc co-localized around the cell nucleus.

From the above experimental results, it was confirmed that since SCOTIN interacts with proteins that are involved not only in the generation of HIV-1, but also in extracellular release, it affects the release of HIV-1.

So far, with respect to the present invention, the preferred examples have been reviewed. Those of ordinary skill in the art to which the present invention pertains will understand that the present invention may be implemented in a modified form without departing from the essential characteristics of the present invention. Therefore, the disclosed examples should be considered in an illustrative sense rather than a restrictive sense. The scope of the present invention is indicated in the claims rather than the foregoing description, and all differences within an equivalent scope should be construed as being included in the present invention.

Sequence List Free Text

```
SEQ ID NO: 1 SCOTIN (SHISA5) protein
MTAPVPAPRI LLPLLLLLLL TPPPGARGEV CMASRGLSLF PESCPDFCCG TCDDQYCCSD    60

VLKKFVWSEE RCAVPEASVP ASVEPVEQLG SALRFRPGYN DPMSGFGATL AVGLTIFVLS   120

VVTIIICFTC SCCCLYKTCR RPRPVVTTTT STTVVHAPYP QPPSVPPSYP GPSYQGYHTM   180
```

PPQPGMPAAP YPMQYPPPYP AQPMGPPAYH ETLAGGAAAP YPASQPPYNP AYMDAPKAAL

SEQ ID NO: 2 Homo sapience Scotin (SHISA5) coding nucleotide sequence
```
atgactgcgc cggtcccgc gccgcggatc ctgttgccgt tgctgttgct gctgctgcta   60
acgccgcctc cgggtgcacg tggtgaggtg tgtatggctt cccgtggact cagcctcttc  120
cccgagtcct gtccagattt ctgctgtggt acctgtgatg accaatactg ctgctctgac  180
gtgctgaaga aatttgtgtg gagcgaggaa aggtgtgctg tgcctgaggc cagcgtgcct  240
gccagtgtag agccggtgga gcagctgggc tcggcgctga ggtttcgccc tggctacaac  300
gaccccatgt cagggttcgg agcgaccttg gccgttggcc tgaccatctt tgtgctgtct  360
gtcgtcacta tcatcatctg cttcacctgc tcctgctgct gcctttacaa gacgtgccgc  420
cgaccacgtc cggttgtcac caccaccaca tccaccactg tggtgcatgc cccttatcct  480
cagcctccaa gtgtgccgcc agctaccct ggaccaagct accagggcta ccacaccatg  540
ccgcctcagc cagggatgcc agcagcaccc tacccaatgc agtacccacc accttaccca  600
gcccagccca tgggcccacc ggcctaccac gagaccctgg ctggaggagc agccgcgccc  660
taccccgcca gccagcctcc ttacaacccg gcctacatgg atgccccgaa ggcggccctc
```

---

The invention claimed is:

1. A method for preventing or treating HIV-1 infectious disease, comprising administering a SCOTIN protein or a polynucleotide encoding the same to a subject in need thereof.

2. The method of claim 1, wherein the HIV-1 infectious disease is acquired immunodeficiency syndrome (AIDS).

3. A method for inhibiting the proliferation of HIV-1 virus, comprising the step of:
   contacting HIV-1 with a composition comprising a SCOTIN protein or a polynucleotide encoding the same.

4. The method of claim 3, wherein the SCOTIN protein comprises the amino acid sequence of SEQ ID NO: 1.

5. The method of claim 3, wherein the polynucleotide encoding the SCOTIN protein comprises the nucleotide sequence of SEQ ID NO: 2.

6. The method of claim 3, wherein the SCOTIN protein inhibits the expression of Gag protein of HIV-1 virus.

7. The method of claim 1, wherein the SCOTIN protein comprises the amino acid sequence of SEQ ID NO: 1.

8. The method of claim 1, wherein the polynucleotide encoding the SCOTIN protein comprises the nucleotide sequence of SEQ ID NO: 2.

9. The method of claim 1, wherein the SCOTIN protein inhibits the expression of Gag protein of HIV-1 virus.

* * * * *

SEQUENCE LISTING

<160> NUMBER OF SEQ ID NOS: 2

<210> SEQ ID NO 1
<211> LENGTH: 240
<212> TYPE: PRT
<213> ORGANISM: Homo sapiens

<400> SEQUENCE: 1

```
Met Thr Ala Pro Val Pro Ala Pro Arg Ile Leu Leu Pro Leu Leu Leu
1               5                   10                  15

Leu Leu Leu Thr Pro Pro Gly Ala Arg Gly Glu Val Cys Met
            20                  25                  30

Ala Ser Arg Gly Leu Ser Leu Phe Pro Glu Ser Cys Pro Asp Phe Cys
        35                  40                  45

Cys Gly Thr Cys Asp Asp Gln Tyr Cys Cys Ser Asp Val Leu Lys Lys
    50                  55                  60

Phe Val Trp Ser Glu Glu Arg Cys Ala Val Pro Glu Ala Ser Val Pro
65                  70                  75                  80

Ala Ser Val Glu Pro Val Glu Gln Leu Gly Ser Ala Leu Arg Phe Arg
                85                  90                  95

Pro Gly Tyr Asn Asp Pro Met Ser Gly Phe Gly Ala Thr Leu Ala Val
            100                 105                 110

Gly Leu Thr Ile Phe Val Leu Ser Val Val Thr Ile Ile Ile Cys Phe
        115                 120                 125

Thr Cys Ser Cys Cys Cys Leu Tyr Lys Thr Cys Arg Arg Pro Arg Pro
    130                 135                 140

Val Val Thr Thr Thr Thr Ser Thr Thr Val Val His Ala Pro Tyr Pro
145                 150                 155                 160

Gln Pro Pro Ser Val Pro Pro Ser Tyr Pro Gly Pro Ser Tyr Gln Gly
                165                 170                 175

Tyr His Thr Met Pro Pro Gln Pro Gly Met Pro Ala Ala Pro Tyr Pro
            180                 185                 190

Met Gln Tyr Pro Pro Pro Tyr Pro Ala Gln Pro Met Gly Pro Pro Ala
        195                 200                 205
```

| Tyr | His | Glu | Thr | Leu | Ala | Gly | Gly | Ala | Ala | Ala | Pro | Tyr | Pro | Ala | Ser |
|-----|-----|-----|-----|-----|-----|-----|-----|-----|-----|-----|-----|-----|-----|-----|-----|
|     | 210 |     |     |     | 215 |     |     |     |     | 220 |     |     |     |     |     |

| Gln | Pro | Pro | Tyr | Asn | Pro | Ala | Tyr | Met | Asp | Ala | Pro | Lys | Ala | Ala | Leu |
|-----|-----|-----|-----|-----|-----|-----|-----|-----|-----|-----|-----|-----|-----|-----|-----|
| 225 |     |     |     |     | 230 |     |     |     |     | 235 |     |     |     |     | 240 |

<210> SEQ ID NO 2
<211> LENGTH: 720
<212> TYPE: DNA
<213> ORGANISM: Homo sapiens

<400> SEQUENCE: 2

```
atgactgcgc cggtccccgc gccgcggatc ctgttgccgt tgctgttgct gctgctgcta      60
acgccgcctc cgggtgcacg tggtgaggtg tgtatggctt cccgtggact cagcctcttc     120
cccgagtcct gtccagattt ctgctgtggt acctgtgatg accaatactg ctgctctgac     180
gtgctgaaga aatttgtgtg gagcgaggaa aggtgtgctg tgcctgaggc cagcgtgcct     240
gccagtgtag agccggtgga gcagctgggc tcggcgctga ggtttcgccc tggctacaac     300
gaccccatgt cagggttcgg agcgaccttg gccgttggcc tgaccatctt tgtgctgtct     360
gtcgtcacta tcatcatctg cttcacctgc tcctgctgct gcctttacaa gacgtgccgc     420
cgaccacgtc cggttgtcac caccaccaca tccaccactg tggtgcatgc cccttatcct     480
cagcctccaa gtgtgccgcc cagctaccct ggaccaagct accagggcta ccacaccatg     540
ccgcctcagc cagggatgcc agcagcaccc tacccaatgc agtacccacc accttaccca     600
gcccagccca tgggcccacc ggcctaccac gagaccctgg ctggaggagc agccgcgccc     660
tacccccgcca gccagcctcc ttacaacccg gcctacatgg atgccccgaa ggcggccctc     720
```